(12) United States Patent
Baisley

(10) Patent No.: US 6,625,663 B1
(45) Date of Patent: Sep. 23, 2003

(54) METHOD FOR STREAMING OBJECT MODELS THAT HAVE A PLURALITY OF VERSIONED STATES

(75) Inventor: Donald Edward Baisley, Laguna Hills, CA (US)

(73) Assignee: Unisys Corp., Blue Bell, PA (US)

( * ) Notice: Subject to any disclaimer, the term of this patent is extended or adjusted under 35 U.S.C. 154(b) by 0 days.

(21) Appl. No.: 09/533,343

(22) Filed: Mar. 23, 2000

(51) Int. Cl.$^7$ .............................................. G06F 15/163
(52) U.S. Cl. ........................ 709/310; 709/231; 707/100
(58) Field of Search ................................. 707/100, 101, 707/105, 109; 709/310, 231

(56) References Cited

U.S. PATENT DOCUMENTS 6,301,585 B1 * 10/2001 Milne ..................... 707/103 R
6,377,939 B1 * 4/2002 Young ........................ 705/34
6,502,112 B1 * 12/2002 Baisley ..................... 715/513

OTHER PUBLICATIONS

Mark Lewis, "Digital Dish", 2000, p. 1–6.*
Dennis Bathory–Kitsz, "Kalos Damian", May 1997.*
S> Brodsky, "XMI Opens Application Interchage" Mar. 1999, p. 1–12.*

* cited by examiner

*Primary Examiner*—John Follansbee
*Assistant Examiner*—Phuong Hoang
(74) *Attorney, Agent, or Firm*—Phuong-Quan Hoang; Mark T. Starr; Lise A. Rode

(57) ABSTRACT

A computer-implemented method for streaming object models with a plurality of versioned states. The method comprises the steps of streaming out each versioned state for each nonderived classifier-level feature; streaming out each versioned state of each unowned object within the model; streaming out versioned state of each owned object not yet streamed out; streaming out the versioned state of each link not represented by a reference; and streaming out a version graph using normal XMI.

18 Claims, 8 Drawing Sheets

METHOD FOR STREAMING OBJECT MODELS THAT HAVE A PLURALITY OF VERSIONED STATES

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates in general to the field of object-oriented programming and in particular to a method for readily transporting an object model from one tool to another wherein the object model includes a plurality of versioned states.

BACKGROUND OF THE INVENTION

With the advent of modeling tools and repositories, capabilities for software modeling has improved. However, when it becomes necessary to transfer a software model from one modeling tool or repository to another, many problems arise. For example, if the modeling tools are different, then the model must be translated into a language that the second modeling tool can understand. XML Metadata Interchange (XMI) provides a standardized means of exchanging models using XML (Extensible Markup Language) streams. Reference is made to the OMG Document ad/98-10-05.

However, XMI does not handle the case where a plurality of versioned states of a model must be streamed together. In this case, the transferred content must include a version graph and must show how details and modifications of the model are related to versioned objects in the version graph. Changes are tracked at the finer grain of objects, links, and structural features; but, changes belong to versions and a version defines the state of a model.

Without the method of the current invention, transferring a plurality of versioned states of a model involves transferring the model separately for each versioned state. This approach incurs an enormous overhead because information common to many versions is transferred redundantly. Also, the receiving tool or repository must then incur the further overhead of reconstructing the detailed change tracking between the versioned states of the model by analyzing differences in the separate transmissions of the model.

A further problem with the current methods for transferring versioned states of a model arises from an object having different identifies in different versions. When an object is transferred separately for separate versions of a model, the object assumes a different identity in each case. The lack of a single identity for an object creates difficulty for external models that link to the object. Each external link to an object must be updated to identify each new version of the object. The result is unnecessary propagation of versioned changes into external models that have not really changed at all.

SUMMARY OF THE INVENTION

Accordingly, it is an object of the present invention to provide an effective means for streaming a plurality of versioned states of a model together with a version graph.

It is a further object of the present invention to capture within a single stream the complete and detailed tracking of changes between versions of a model.

It is also an object of the present invention to stream a plurality of versioned states without redundancy in order to minimize the amount of data transferred.

An important advantage of the present invention is that a single object has a single identity within a streamed content. Differences between versions are shown at the level of detail of the metamodel (the model that describes the model). Changing a property of an object does not require the object to be duplicated nor does it require pointers to the object to have new versions pointing at a duplicated new version of the object.

A further advantage of the present invention is that a version graph applies to an entire model rather than having separate version graphs for individual objects within a model. This reduces overhead and complexity substantially for models containing many objects.

These and other objects, which will become apparent as the invention is described in detail below, are provided by a computer-implemented method for streaming object models with a plurality of versioned states. The method comprises the steps of streaming out each versioned state for each nonderived classifier-level feature; streaming out each versioned state of each unowned object within the model; streaming out versioned state of each owned object not yet streamed out; streaming out the versioned state of each link not represented by a reference; and streaming out a version graph using normal XMI.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the spirit and scope of the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Figure 1:
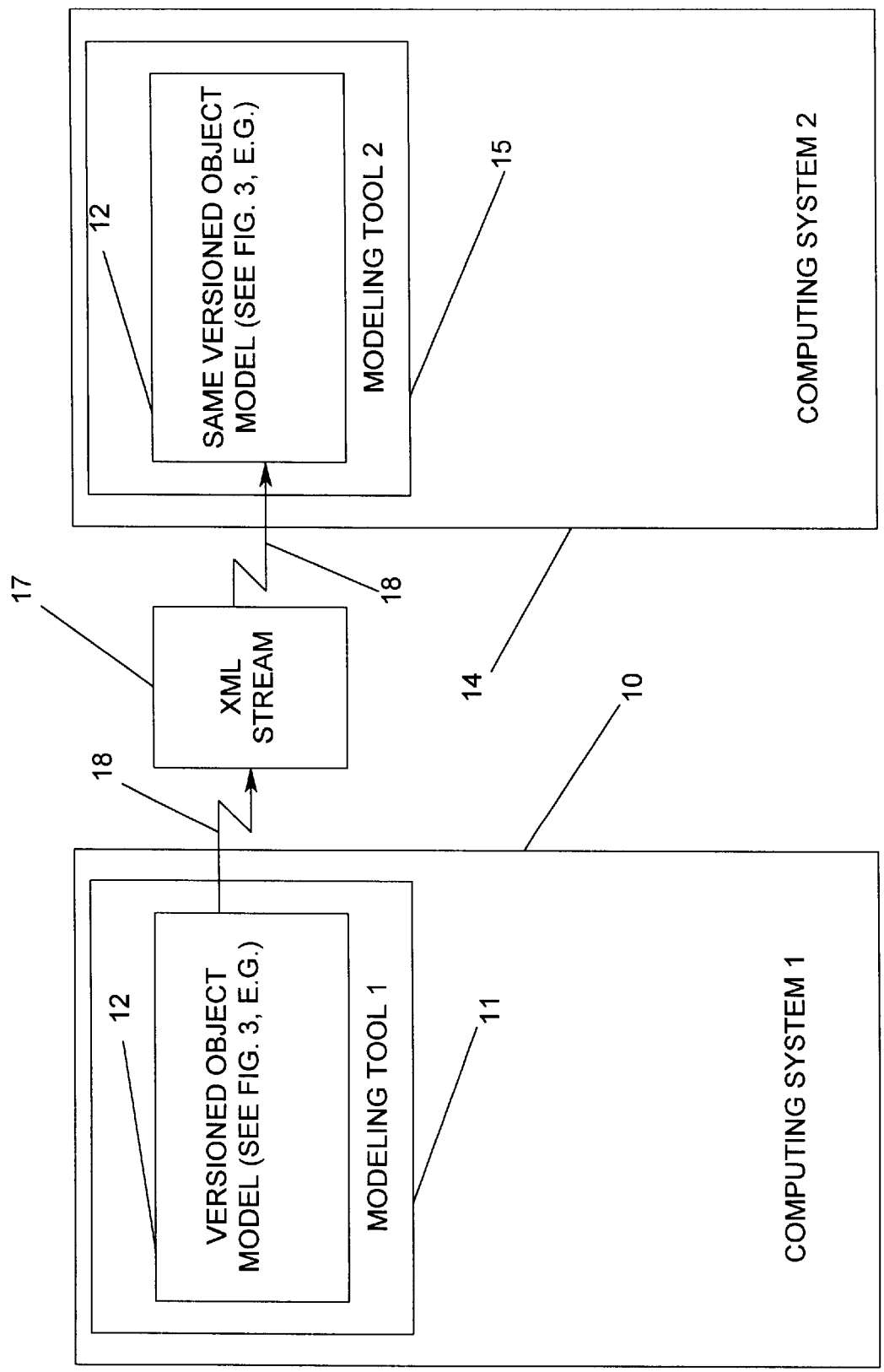
FIG. 1 is a block diagram illustrating the transfer operation of a plurality of versioned states of an object model from one computer system to another employing the method of the present invention.

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, each of which can be either an operation or a structural feature. An operation defines an action that an object can perform, or an action that can be performed on the object. For example, "make withdrawal" could be defined as an operation on a customer account object. Structural features indicate the state of an object. Structural features of an object have values, and these values that define the state of the object. A structural feature can be either an attribute or a reference. An attribute defines a value that is maintained by the object. For example, "current account balance" could be an attribute of the customer account object. The numeric value for the customer's account balance would be stored in the customer account object. Attributes can be either instance-level or classifier-level. If instance-level, an attribute has separate values for each object in a class. If classifier-level, an attribute has the same values for all members of the class, so it applies once for an entire model rather than separately to each object. A reference is a feature of an object, which relates the object to another object through a link. A link associates two objects. A reference represents a link within the objects it connects. There can be a reference on either end of a link, on both ends, or on neither end. As an example, a link would be used to connect an account object to a separate customer object. The account object could then contain a reference to the customer object, and the customer object could contain a reference to the account object. Some associations define composition, which mean that a link creates an ownership relationship such that one object owns the other.

An exemplary composition is illustrated in Appendix A in the XML for version 0.0 where the object shown by the XML element having xmi.id='Obj1' is an unowned object (Appendix A, page 30, line 10), and where the objects shown by XML elements with xmi.id='Obj2' (Appendix A, page 30, line 14) and xmi.id='Obj3' (Appendix A, page 30, line 18) are owned objects of the unowned object 'Obj1'. The owned objects 'Obj2' and 'Obj3' are nested within the 'Obj1' element.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently. The term stream or streaming shall mean any flow of data from a source (or sender, producer) to a single sink (or receiver, consumer). A stream usually flows through a channel of some kind, as opposed to packets, which may be addressed and routed independently, possibly to multiple recipients. In C programming a buffered input/output library functions, a stream is associated with a file or device, which has been opened using the open function. Characters may be read from (written to) a stream without knowing their actual source (destination) and buffering is provided transparently by the library routines.

A version is an object that can be thought of in two ways. First, a version is a view of a model's state: i.e., what versioned objects exist and what are the values of their structural features? This can be a frozen historical state or a current, or active state. Second, a version can be thought of as a set of changes that create a new state from a previous one. The set of changes can be small or large; or, it can involve a single object or a great number of objects.

A version graph is a model of interrelated versions starting with an initial version, which then links to successive versions either directly or through branches that create alternate paths of modification to the versioned model. The term element as used herein with the phrase within an XML element shall mean all those code terms between brackets as defined by the rules of XML.

A version graph having two branches and three versions is shown in Appendix A as composite XML elements with xmi.id='b0' (Appendix A, page 29, line 37) and xmi.id='b001' (Appendix A, page 29, line 59).

Versioning is orthogonal to the metamodels of information that can be versioned. For example, the standard UML metamodel does not address versioning. UML can be deployed in a repository with or without versioning. UML's structure, constraints and methods are the same regardless of versioning.

An object does not change its identity across versions, but its structural features can change. For example, suppose a UML UseCase is created with the name "Correct". In a later version its name is changed to "Revise". The same object exists in both versions. With respect to the later version, asking for the object's name is answered with "Revise". With respect to the earlier version, asking for the same object's name is answered with "Correct". With respect to a version that precedes creation of the UseCase, the object does not exist (as if it had been deleted).

The versioned states of a model include information relating each object, link, and attribute value to the version in which it is created or established, and to the zero of more versions in which it is deleted or removed. A single object, link or attribute value can be deleted or removed in multiple versions because of version graph can support branching. For example, an object created on one version can continue to exist in some branches of the version graph while being deleted in others.

Referring now to FIG. 1, a block diagram generally illustrates the transfer operation of a versioned object model from one computer system to another employing the method of the present invention. A first computing system 10 is shown executing any of a variety of commercially available software modeling tools 11 in which a versioned object model 12 is developed therewith. A second computing system 14 is also shown executing any of a variety of commercially available software modeling tools 15 in which the same versioned object model 12 has been transported thereto and stored therein. The modeling tool 15 may be the same or different from the tool 11.

The method of the present invention is generally referred to in FIG. 1 as XML stream 17 and represents the conversion of the model 12 into XML for transporting to the second computing system 14 via any commercially available links 18. The normal XMI rendering of a versioned object model reveals only a single version of the object model. The present invention is a method for rendering all of the versioned states of the model (e.g., model 12) within a single stream.

Figure 2:
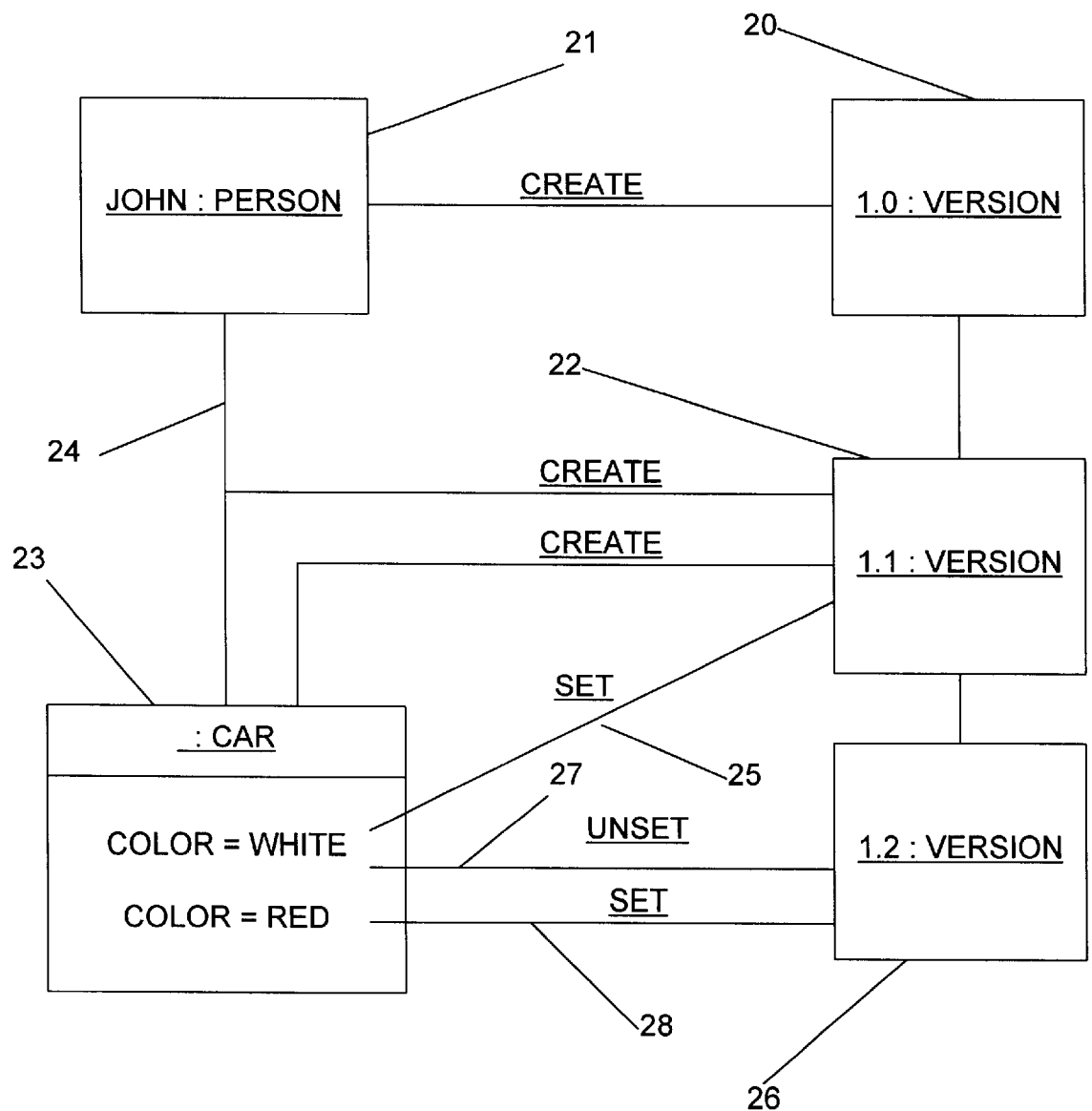
FIG. 2 is a UML object diagram illustrating three versioned states of a model to be transferred.

Referring now to FIG. 2, a UML object diagram illustrating three versioned states of a model to be transferred is shown. Assume for this model example that a person named John exists. Later a white car is manufactured and John buys it. Finally, he has the car painted red. For the first version 1.0 (block 20), an object 21 is created for John: Person. For the second version 1.1 an object 23 is created for: Car, a link 24 between the objects 21 and 23 is also created, and a color attribute of the car is set to white (line 25). For a third version 1.2 (block 26) the color attribute of white is unset (line 27) and the color red is set in its place (line 28).

Following is an example of how the versioned states of the model in FIG. 2 can be streamed as XML using the method of the present invention. The stream assumes a metamodel named M for persons and cars and a metamodel named V for the version graph.

```
<XMI.content>
    <M.Person xmi.id="p" xmi.version="v10">
        <M.Person.name>John</M.Person.name>
        <M.Person.car xmi.version="v11">
            <M.Car xmi.idref="c" />
        </M.Person.car>
    </M.Person>
    <M.Car xmi.id="c" xmi.version="v11">
        <M.Car.color xmi.endVersion="v12" xmi.value="white"/>
        <M.Car.color xmi.version="v12" xmi.value="red" />
        <M.Car.owner>
            <M.Person xmi.idref="p" />
        </M.Car.owner>
    </M.Car>
    <V.Version xmi.id="v10">
        <V.Version.id>1.0</V.Version.id>
        <V.Version.isMutable xmi.value="false" />
        <V.Version.nextVersion>
            <V.Version xmi.idref="v11" />
        </V.Version.nextVersion>
    </V.Version>
    <V.Version xmi.id="v11">
        <V.Version.id>1.1</V.Version.id>
        <V.Version.isMutable xmi.value="false" />
        <V.Version.previousVersion>
            <V.Version xmi.idref="v10" />
        </V.Version.previousVersion>
        <V.Version.nextVersion>
            <V.Version xmi.idref="v12" />
        </V.Version.nextVersion>
    </V.Version>
    <V.Version xmi.id="v12">
        <V.Version.id>1.2</V.Version.id>
        <V.Version.isMutable xmi.value="true" />
        <V.Version.previousVersion>
            <V.Version xmi.idref="v11" />
        </V.Version.previousVersion>
    </V Version>
</XMI.content>
```

An example of an XML stream containing various versioned states is set forth in Appendix A hereof.

It is noted that only nonderived features are streamed into XML because derived features, having computed values, can be recomputed by a receiver of a stream. All features shown in the example in Appendix A and in the preceding example are nonderived.

Figure 3A:
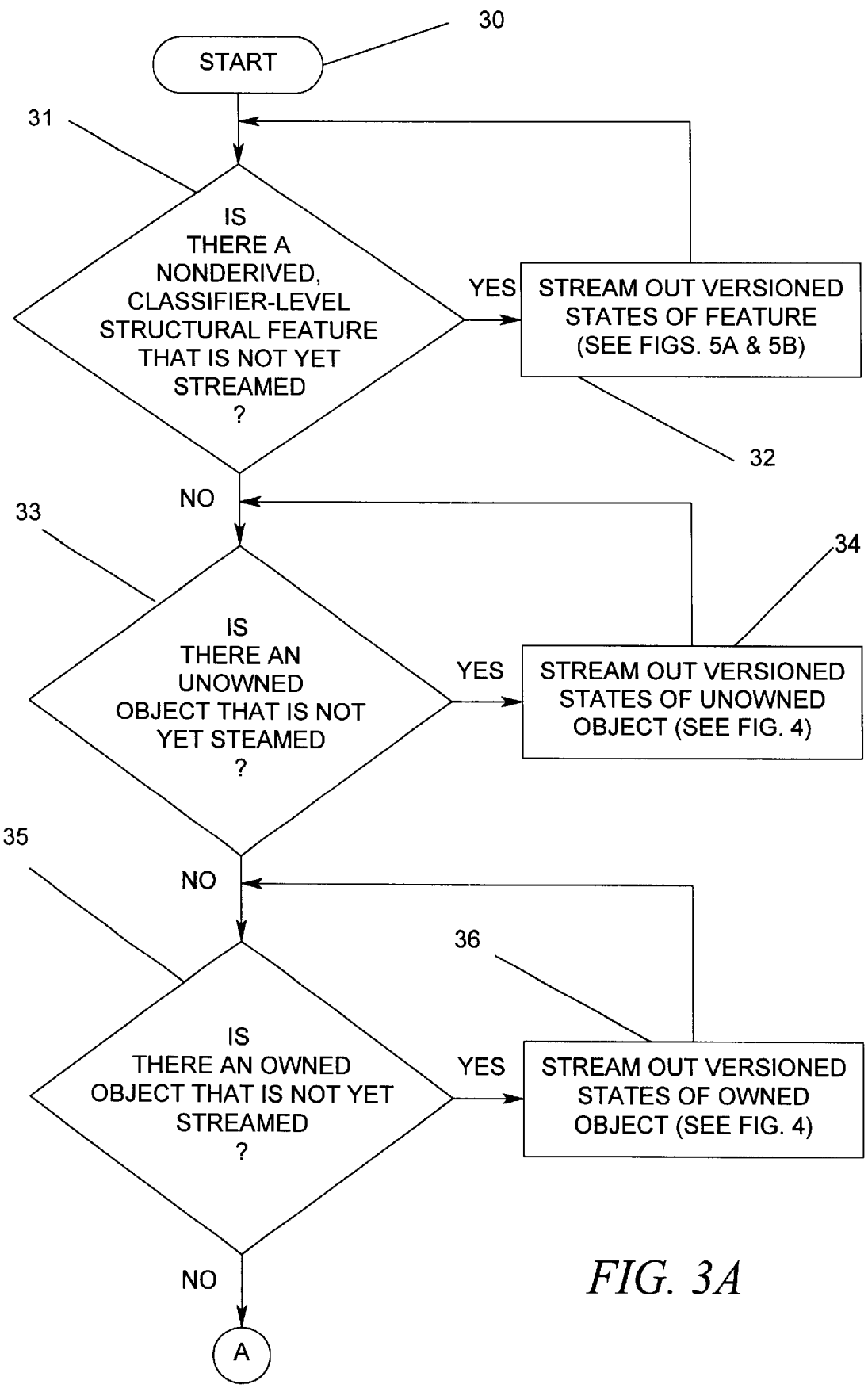
FIGS. 3A and 3B combined form a flow chart of the overall process of the present invention.

Referring now to FIG. 3A, the first of a two-sheet drawing illustrates a flow chart of the overall process for the present invention. The process begins with a start bubble 30 followed by an inquiry as to whether or not there is a nonderived, classifier-level structural feature that is not yet streamed (diamond 31). If the answer to this inquiry is yes, then the versioned states of the feature are streamed out (block 32). Details of this step are amplified in FIGS. 5A and 5B and described in greater detail hereinbelow. If the answer to this inquiry is no, then another inquiry is made as to whether or not there is an unowned object that is not yet streamed (diamond 33). If the answer to this inquiry is yes, then versioned states of the unowned object is streamed out (block 34). Details of this step are amplified in FIG. 4 and described in greater detail hereinbelow.

If the answer to the inquiry in the diamond 33 is no, then yet another inquiry is made as to whether or not there is an owned object that is not yet streamed (diamond 35). It is possible that some owned objects have not yet been streamed at this point if they are owned through composite links that do not have a reference on the owners end. Otherwise, each owned object has already been streamed within the element representing its owner (per FIGS. 5A and 5B). If the answer to this inquiry is yes, then versioned states of the owned object is streamed out (block 36). Details of this step are amplified in FIG. 4 and described in greater detail hereinbelow. On the other hand, if the inquiry in the diamond 35 is no, then the process continues on the next sheet of drawings as depicted by a connector A.

Figure 3B:
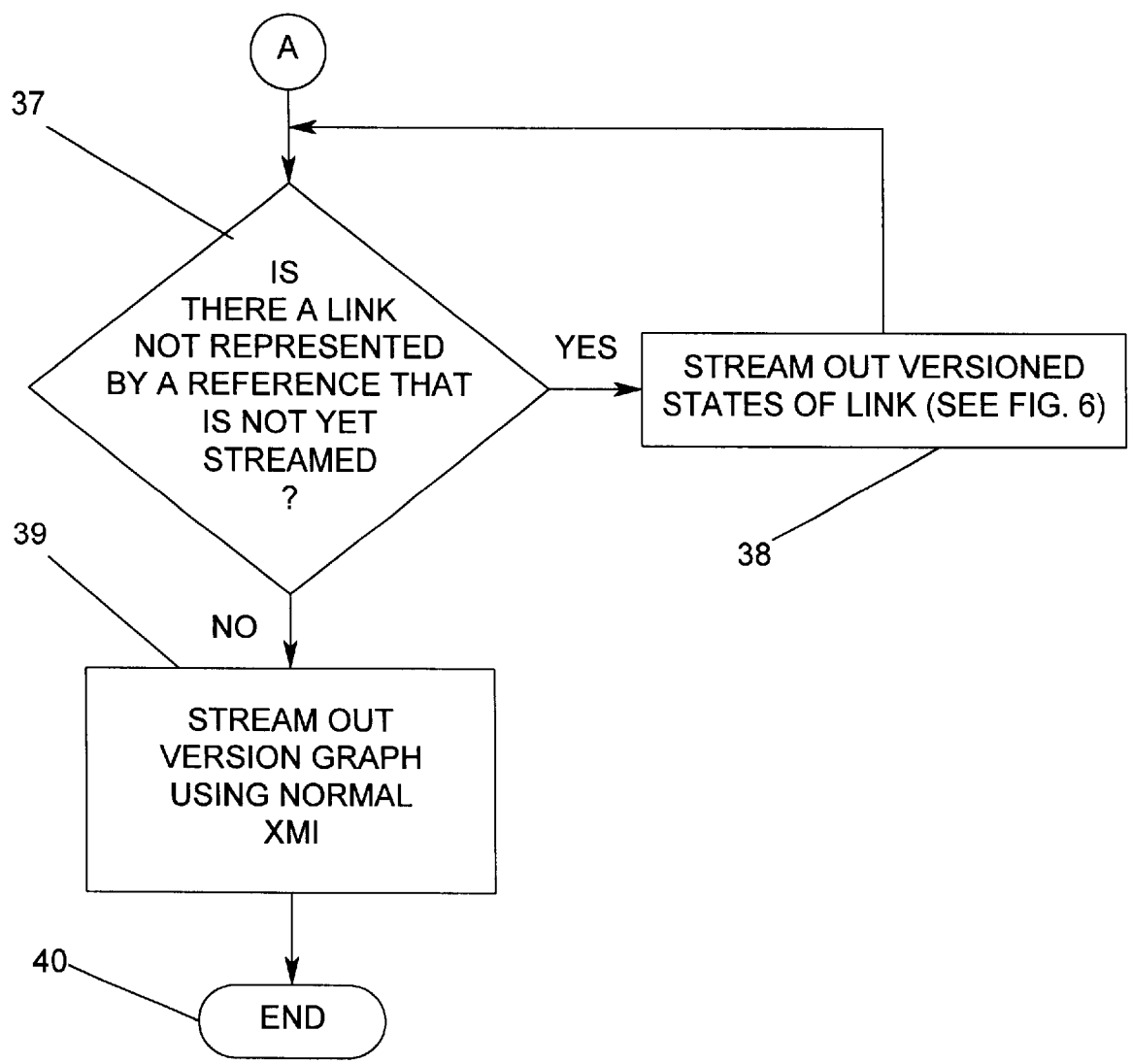

Referring now to FIG. 3B at the connector A, still another inquiry is made as to whether or not there is a link not represented by a reference that is not yet streamed (diamond 37). If the answer to this inquiry is yes, then versioned states of link are streamed out (block 38). Details of this step are amplified in FIG. 6 and described in greater detail hereinbelow. Note that links represented by references are streamed as structural features per FIGS. 5A and 5B, so there is no need to stream them separately as links. On the other hand, if the answer to the inquiry in the diamond 37 is no, then a version graph is streamed out using normal XMI (block 39) and the process ends (bubble 40).

Figure 4:
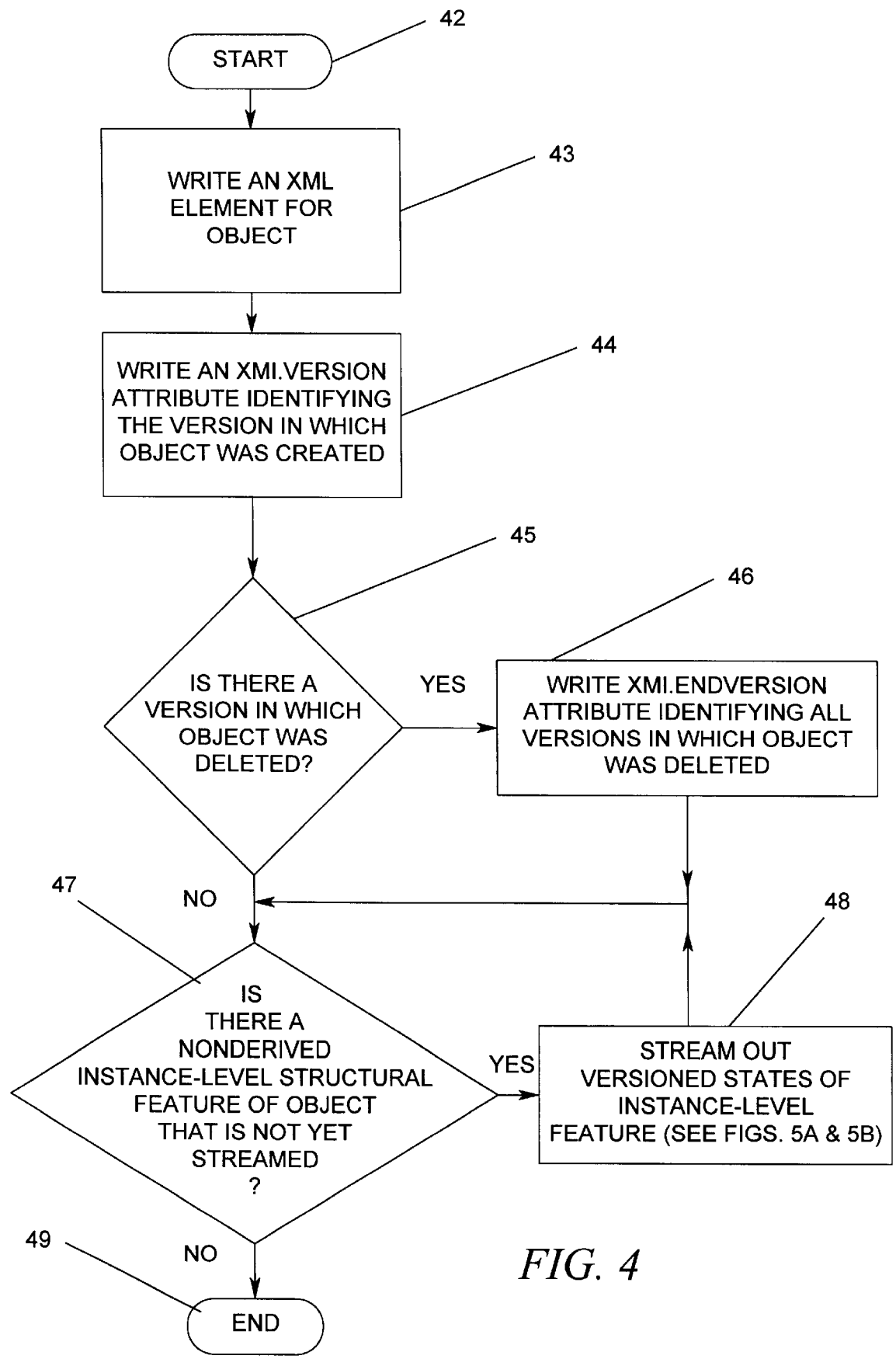
FIG. 4 is a flow chart of the method for streaming out versioned states of an object.

Referring now to FIG. 4, a flow chart of the method for streaming out versioned states of an object is shown. The process begins with a start bubble 42 followed by a step of writing an XML element for the object (block 43). Next, an xmi.version attribute identifying the version in which the object was created is written (block 44). After this, an inquiry is made as to whether or not there is a version in which the object was deleted (diamond 45). If the answer to this inquiry is yes, then an xmi.endVersion attribute identifying all versions in which the object was deleted is written (block 46). A version can be deleted in multiple versions if there are branches in the version graph. Upon completion of this step or if the answer to the inquiry in the diamond 45 is no, then another inquiry is made as to whether or not there is a nonderived, instance-level structural feature of the object that is not yet streamed (diamond 47).

If the answer to the inquiry in the diamond 47 is yes, then versioned states of the instance-level feature are streamed out (block 48). Details of this step are amplified in FIGS. 5A and 5B and described in greater detail hereinbelow. Upon completion of this step a return is made back to the inquiry diamond 47. If the inquiry in the diamond 47 is no then the process ends (bubble 49).

Figure 5A:
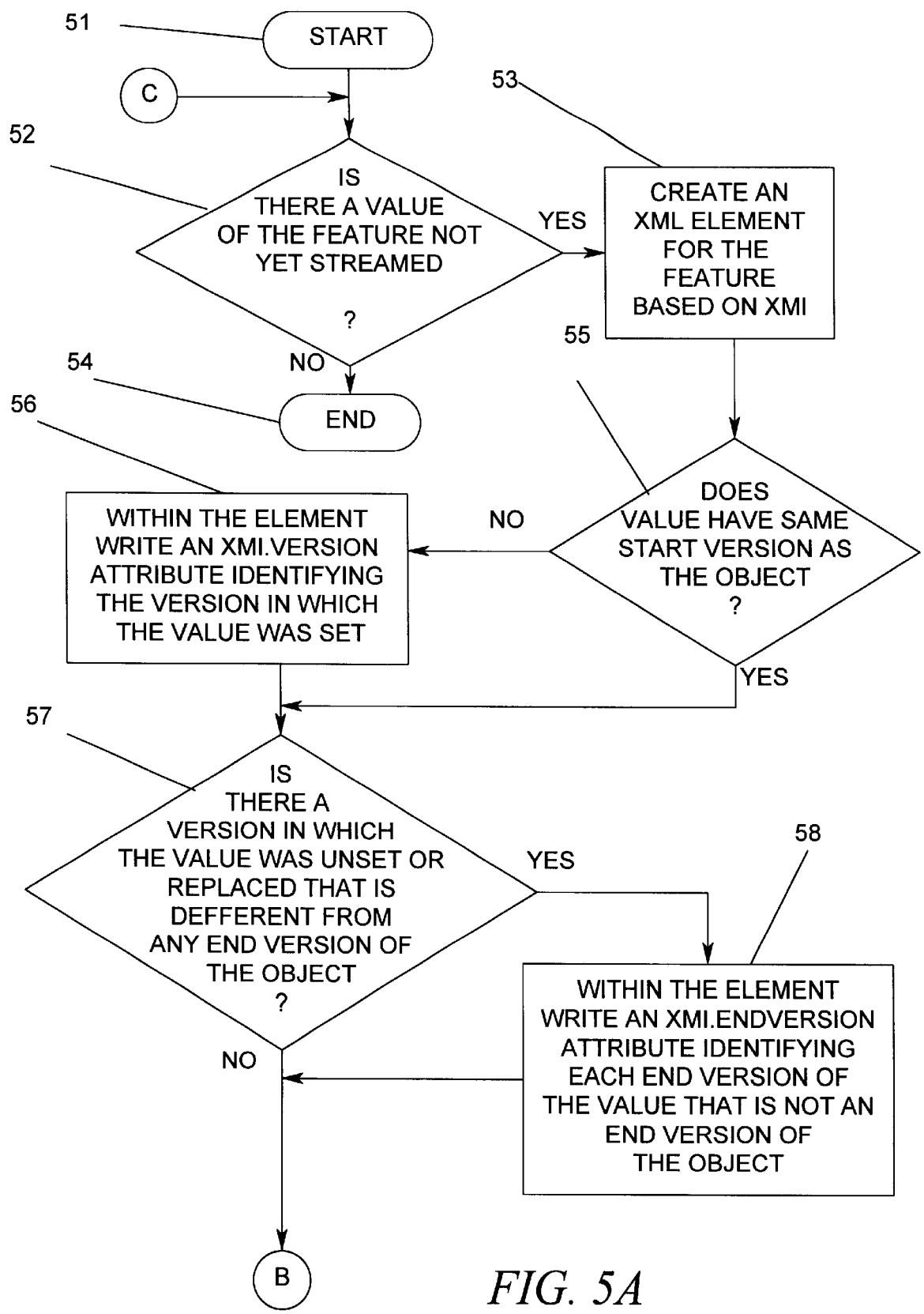
FIGS. 5A and 5B combined form a flow chart of the method for streaming out versioned states of a structural feature.

Referring now to FIG. 5A, the first of a two-sheet drawing of a flow chart of the method for streaming out versioned states of a structural feature is shown. The process begins with a start bubble 51 followed by an inquiry as to whether or not there is a value of the feature not yet streamed (diamond 52). If the answer to this inquiry is yes, then an XML element for the feature is created based on XMI (block 53). On the other hand, if the answer to this inquiry is no, then the process ends (bubble 54).

Upon completion of the step depicted by the block 53, another inquiry is made as to whether or not the value has the same start version as the object (diamond 55). If the answer to this inquiry is no, then an xmi.version attribute identifying the version in which the value was set is written within the element (block 56). Upon completion of this step, or if the answer to the inquiry in the diamond 55 is yes, yet another inquiry is made as to whether or not there is a version in which the value was unset or replaced that is different from the end version of the object (diamond 57).

If the answer to the inquiry in the diamond 57 is yes, then an xmi.endversion attribute identifying each end version of the value that is not an end version of the object is written within the element (block 58). Upon completion of this step or if the answer to the inquiry in the diamond 57 is no, then the process illustration continues on the next sheet of the drawings as depicted by a connector B.

Figure 5B:
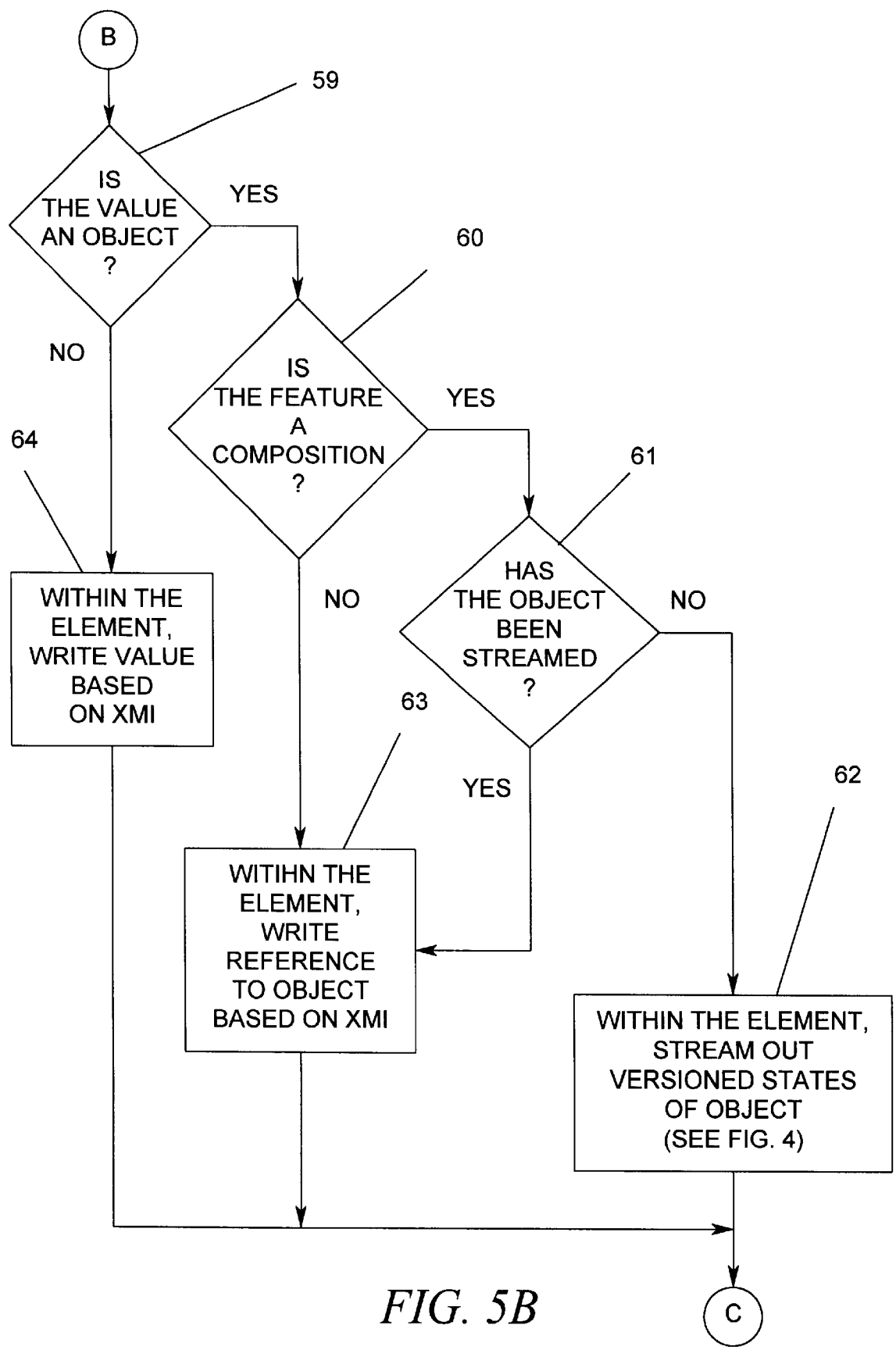

Referring now to FIG. 5B at the connector B, an inquiry is made as to whether or not the value of the structural feature is an object (diamond 59). If the answer to this inquiry is yes, then another inquiry is made as to whether or not this is a feature of a composition (diamond 60). If the answer to this latter inquiry is yes, then still another inquiry is made as to whether or not the object has been streamed (diamond 61). If the answer to this inquiry is no, then the versioned state of the object is streamed out within the element (block 62). Details of this step are amplified in FIG. 4 and described hereinabove. Upon completion of the step depicted by the block 62, a return is made back to the diamond 52 (FIG. 5A) for processing the next value of the feature as denoted by a connector C.

With reference again to the diamond 61, if the answer to this inquiry is yes, then the reference to the object is written within the element based on XMI (block 63). Upon completion of this step a return is made back to the diamond 52 (FIG. 5A) via the connector C. With reference again to the diamond 60, if the answer to this inquiry is no, then the reference to the object is written within the element based on XMI (block 63). Upon completion of this step a return is made back to the diamond 52 (FIG. 5A) via the connector C. With reference to the diamond 59, if the answer to this inquiry is no, then the value is a data value such as a number or string and is written within the element based on XMI (block 64). Upon completion of this step a return is made back to the diamond 52 (FIG. 5A) via the connector C.

Figure 6:
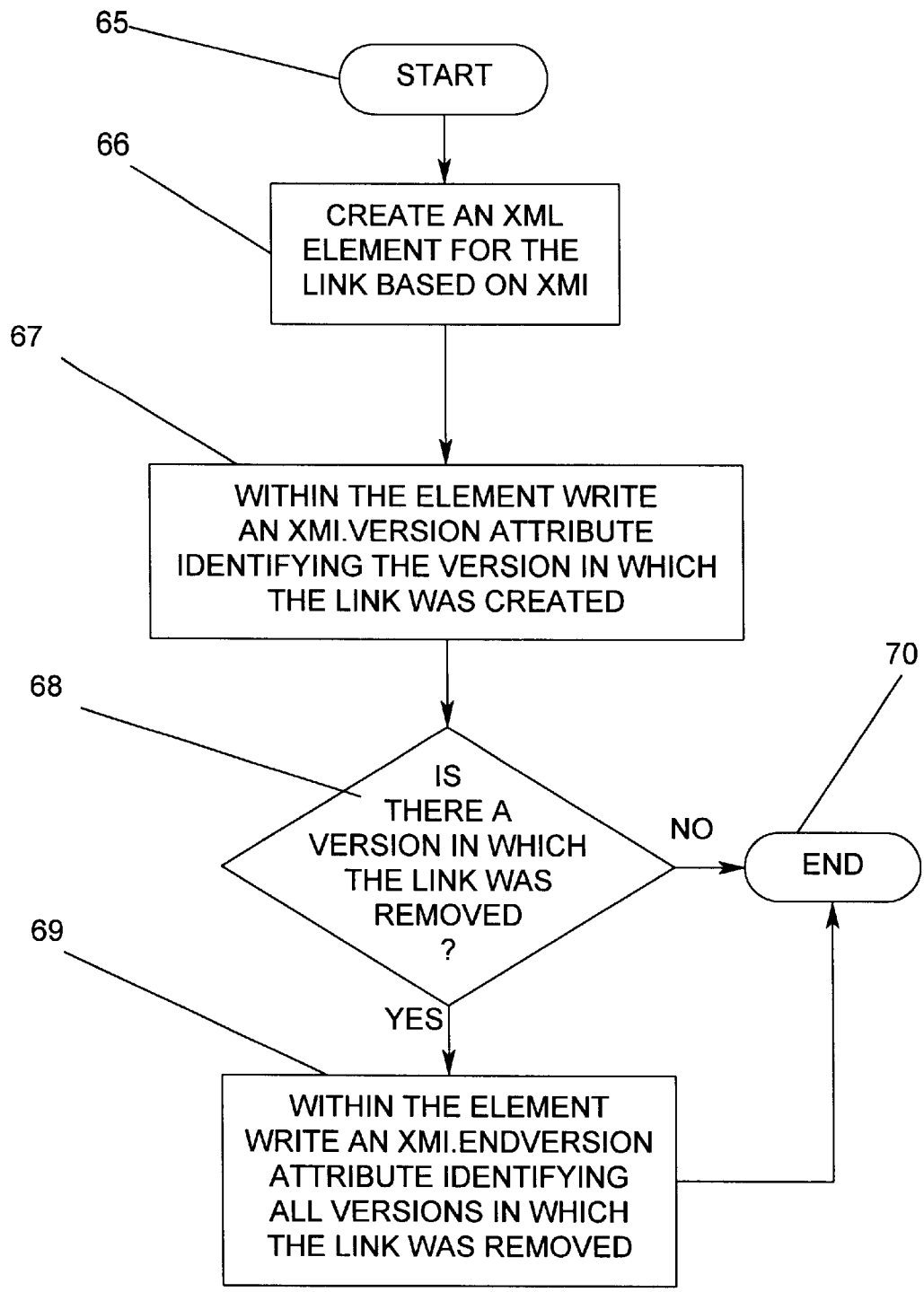
FIG. 6 is a flow chart of the method for streaming out versioned states of a link.

Referring now to FIG. 6, a flow chart of the method for streaming out versioned states of a link is shown. The process begins with a start bubble 65 followed by a step of creating an XML element for the link based on XMI (block 66). Next, an xmi.version attribute identifying the version in which the link was created is written within the element (block 67). After this, an inquiry is made as to whether or not there is a version in which the link was removed (diamond 68). If the answer to this inquiry is yes, then an xmi.endversion attribute identifying all versions in which the link was removed is written within the element (block 69). Upon completion of this step, or if the answer to the inquiry in the diamond 68 is no, the process ends (bubble 70).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

APPENDIX A

XML Complete Content Example

Here is an example of versioned XML content, which includes three versions. Version 0.0 is the initial version. Version 0.1 is its next version. Version 0.0.1.0 is on a branch off of version 0.0. The changes are explained and XML is shown for each individual version following the versioned XML.

```
<MP.Obj xmi.id='Obj1' xmi.version='v00'>
  <MP.Obj.name xmi.endVersion='v01'>Bob</MP.Obj.name>
  <MP.Obj.name xmi.version='v01'>Robert</MP.Obj.name>
  <MP.Obj.isRoot xmi.value='true' xmi.endVersion='v0010'/>
  <MP.Obj.isRoot xmi.value='false' xmi.version='v0010'/>
  <MP.Obj.content xmi.endVersion='v0010'>
    <MP.Obj xmi.id='Obj2' xmi.version='v00'>
      <MP.Obj.name>Sue</MP.Obj.name>
      <MP.Obj.isRoot xmi.value='false' xmi.endVersion='v0010'/>
      <MP.Obj.isRoot xmi.value<'true' xmi.version='v0010'/>
      <MP.Obj.content xmi.version='v0010'>
        <MP.Obj xmi.idref='Obj1'/>
        <MP.Obj xmi.idref='Obj3'/>
      </MP.Obj.content>
    </MP.Obj>
  </MP.Obj.content>
  <MP.Obj.content xmi.endVersion='v01 v0010'>
    <MP.Obj xmi.id='Obj3' xmi.version='v00' xmi.endversion='v01'>
      <MP.Obj.name>Jim</MP.Obj.name>
      <MP.Obj.isRoot xmi.value='false'/>
    </MP.Obj>
  </MP.Obj.content>
  <MP.Obj.content xmi.version='v01'>
    <MP.Obj xmi.id='Obj4' xmi.version='v01'>
      <MP.Obj.name>Mary</MP.Obj.name>
      <MP.Obj.isRoot xmi.value='false'/>
    </MP.Obj>
  </MP.Obj.content>
</MP.Obj>
<Versioning.Branch xmi.id='b0'>
  <Versioning.Branch.id>0</Versioning.Branch.id>
  <Versioning.Branch.version>
    <Versioning.Version xmi.id='v00'/>
      <Versioning.Version.id>0.0</Versioning.Version.id>
      <Versioning.Version.isMutable xmi.value='false'/>
      <Versioning.Version.nextVersion>
        <versioning.version xmi.idref='v01'/>
      </Versioning.Version.nextVersion>
      <Versioning.Version.branchTarget>
        <Versioning.Branch xmi.idref='b001'/>
      </Versioning.Version.branchTarget>
    </Versioning.Version>
    <Versioning.Version. xmi.id='v01'>
      <Versioning.Version.id>0.1</versioning.version.id>
      <Versioning.Version.isMutable xmi.value='true'/>
      <Versioning.Version.previousVersion>
        <Versioning.Version xmi.idref='v00'/>
      </Versioning.Version.previousVersion>
    </Versioning.Version>
  </Versioning.Branch.version>
</Versioning.Branch>
<Versioning.Branch xmi.id ='b001'>
  <Versioning.Branch.id>0.0.1</Versioning.Branch.id>
  <Versioning.Branch.sourceversion>
    <Versioning.Version xmi.idref='v00'/>
  </Versioning.Branch.sourceVersion>
  <Versioning.Branch.version>
    <Versioning.Version xmi.id='v0010'>
```

APPENDIX A-continued

XML Complete Content Example

```
<Versioning.version.id>0.0.1.0</Versioning.version.id>
<Versioning.version.isMutable xmi.value='true'/>
</Versioning.Version>
</Versioning.Branch.Version>
</Versioning.Branch>
```

Each version's changes and separate XML content representing each version's objects are shown below. Each of the following portions of XML can be streamed based on a normal DTD. Each represents one specific version.

Here are the objects of version 0.0.

```
<MP.Obj xmi.id='Obj1'>
    <MP.Obj.name>Bob</MP.Obj.name>
    <MP.Obj.isRoot xmi.value='true'/>
    <MP.Obj.content>
        <MP.Obj xmi.id='Obj2'>
            <MP.Obj.name>Sue</MP.Obj.name>
            <MP.Obj.isRoot xmi.value='false'/>
        </MP.Obj>
        <MP.Obj xmi.id='Obj3'>
            <MP.Obj.name>Jim</MP.Obj.name>
            <MP.Obj.isRoot xmi.value='false'/>
        </MP.Obj>
    </MP.Obj.content>
</MP.Obj>
```

Here are the objects seen from the perspective of version 0.1. In this version Bob's name is changed to Robert, Jim is deleted, and Mary is added.

```
<MP.Obj xmi.id='Obj1'>
    <MP.Obj.name>Robert</MP.Obj.name>
    <MP.Obj.isRoot xmi.value='true'/>
    <MP.Obj.content>
        <MP.Obj xmi.id='Obj2'>
            <MP.Obj.name>Sue</MP.Obj.name>
            <MP.Obj.isRoot xmi.value='false'/>
        </MP.Obj>
        <MP.Obj xmi.id='Obj4'>
            <MP.Obj.name>Mary</MP.Obj.name>
            <MP.Obj.isRoot xmi.value='false'/>
        </MP.Obj>
    </MP.Obj.content>
</MP.Obj>
```

Here are the objects seen from the perspective of version 0.0.1.0. In this version Sue is made the root object, so Sue's isRoot is set to true and Bob, who is now contained by Sue, has isRoot set to false. Note that because composite relationships can change between versions, composite relationships expressed in versioned XML, as shown above, sometimes use xmi.idref values for composite relationships.

```
<MP.Obj xmi.id='Obj2'>
    <MP.Obj.name>Sue</MP.Obj.name>
    <MP.Obj.isRoot xmi.value='true'/>
    <MP.Obj.content>
        <MP.Obj xmi.id='Obj1'>
            <MP.Obj.name>Bob</MP.Obj.name>
            <MP.Obj.isRoot xmi.value='false'/>
        </MP.Obj>
        <MP.Obj xmi.id='Obj3'>
            <MP.Obj.name>Jim</MP.Obj.name>
            <MP.Obj.isRoot xmi.value='false'/>
        </MP.Obj>
    </MP.Obj.content>
</MP.Obj>
```

What is claimed is:

1. A computer-implemented method for streaming object models with a plurality of versioned states, said method comprising the steps of:
   a. for each nonderived, classifier-level structural feature of said model, streaming out each versioned state of said feature;
   b. for each unowned object within said model, streaming out each versioned state of said unowned object;
   c. for each owned object not yet streamed out, streaming out versioned state of said owned object;
   d. for each link not represented by a reference, streaming out versioned state of said link; and,
   e. streaming out a version graph using normal XMI.

2. A method as in claim 1 where the steps of streaming out each versioned state of an object in steps b and c of claim 1 further comprise the steps of:
   f. writing an XML element for said object based on XMI;
   g. within said element, writing an xmi.version attribute identifying the version in which said object was created;
   h. where said object has been deleted, within said element writing an xmi.endVersion attribute identifying each version in which said object was deleted;
   i. for each nonderived, instance-level structural feature of said object, streaming out each versioned state of said instance-level feature.

3. A method as in claim 2 where the step of streaming out each versioned state of an instance-level structural feature further includes for each value of said structural feature:
   j. creating an XML element for said feature based on XMI;
   k. determining if said value was set in the same version as when said object was created, and if not;
   l. writing an xmi.version attribute within said XML element identifying said version in which said value was set;
   m. determining if said value has an end version which differs from each end version of said object, and if so; and,
   n. writing an xmi.endVersion attribute within said XML element identifying each end version of said value that is not an end version of said object.

4. A method as in claim 3 further including the steps of:
   o. if said value is a data value and not an object, writing said value within said XML element based on XMI;
   p. if said value is an object and said feature is a composition, but said object has not been streamed, streaming out each versioned state of said object within said XML element.

5. A method as in claim 4 further including the steps of:
   q. if said value is an object and said feature is not a composition, within XML element writing a reference to said object based on XMI; and,
   r. if said value is an object and said feature is a composition, but said object has been streamed, within XML element writing a reference to said object based on XMI.

6. A method as in claim 1 where the step of streaming out each versioned state of a classifier-level structural feature further includes for each value of said structural feature:
   f. creating an XML element for said feature based on XMI;
   g. determining if said value was set in the same version as when said object was created, and if not;
   h. writing an xmi.version attribute within said XML element identifying said version in which said value was set;
   i. determining if said value has an end version which differs from each end version of said object, and if so;
   j. writing an xmi.endVersion attribute within said XML element identifying each end version of said value that is not an end version of said object.

7. A method as in claim 6 further including the steps of:
   k. if said value is a data value and not an object, writing said value within said XML element based on XMI;
   l. if said value is an object and said feature is a composition, but said object has not been streamed, streaming out each versioned state of said object within said XML element.

8. A method as in claim 7 further including the steps of:
   m. if said value is an object and said feature is not a composition, within XML element writing a reference to said object based on XMI; and,
   n. if said value is an object and said feature is a composition, but said object has been streamed, within XML element writing a reference to said object based on XMI.

9. A method as in claim 1 where streaming out a versioned step of said link in step d further includes the steps of:
   a. creating an XML element for said link based on XMI;
   b. within said XML element writing an xmi.version attribute identifying the version in which said link was created;
   c. determining if there is a version in which said link was removed, and if so;
   d. within said XML element writing and xmi.endversion attribute identifying all versions in which said link was removed.

10. A storage medium encoded with machine-readable computer program code for streaming object models with a plurality of versioned states, wherein, when the computer program code is executed by a computer, the computer performs the steps of:
   a. for each nonderived, classifier-level structural feature of said model, streaming out each versioned state of said feature;
   b. for each unowned object within said model, streaming out each versioned state of said unowned object;
   c. for each owned object not yet streamed out, streaming out versioned state of said owned object;
   d. for each link not represented by a reference, streaming out versioned state of said link; and,
   e. streaming out a version graph using normal XMI.

11. A storage medium as in claim 10 where the steps of streaming out a versioned state of an object in steps b and c of claim 1 further comprise the steps of:
   a. writing an XML element for said object based on XMI;
   b. within said element, writing an xmi.version attribute identifying the version in which said object was created;
   c. where said object has been deleted, within said element writing an xmi.endVersion attribute identifying each version in which said object was deleted;
   d. for each nonderived, instance-level structural feature of said object, streaming out each versioned state of said instance-level feature.

12. A storage medium as in claim 11 where the step of streaming out each versioned state of an instance-level structural feature further includes for each value of said structural feature:
   j. creating an XML element for said feature based on XMI;
   k. determining if said value was set in the same version as when said object was created, and if not;
   l. writing an xmi.version attribute within said XML element identifying said version in which said value was set;
   m. determining if said value has an end version which differs from each end version of said object, and if so; and,
   n. writing an xmi.endversion attribute within said XML element identifying each end version of said value that is not an end version of said object.

13. A storage medium as in claim 12 further including the steps of:
   o. if said value is a data value and not an object, writing said value within said XML element based on XMI;
   p. if said value is an object and said feature is a composition, but said object has not been streamed, streaming out each versioned state of said object within said XML element.

14. A storage medium as in claim 13 further including the steps of:
   q. if said value is an object and said feature is not a composition, within XML element writing a reference to said object based on XMI; and,
   r. if said value is an object and said feature is a composition, but said object has been streamed, within XML element writing a reference to said object based on XMI.

15. A storage medium as in claim 10 where the step of streaming out each versioned state of a classifier-level structural feature further includes for each value of said structural feature:
   f. creating an XML element for said feature based on XMI;
   g. determining if said value was set in the same version as when said object was created, and if not;
   h. writing an xmi.version attribute within said XML element identifying said version in which said value was set;
   i. determining if said value has an end version which differs from each end version of said object, and if so;
   j. writing an xmi.endversion attribute within said XML element identifying each end version of said value that is not an end version of said object.

16. A storage medium as in claim 15 further including the steps of:
   k. if said value is a data value and not an object, writing said value within said XML element based on XMI;
   l. if said value is an object and said feature is a composition, but said object has not been streamed, streaming out each versioned state of said object within said XML element.

17. A storage medium as in claim 15 further including the steps of:
- m. if said value is an object and said feature is not a composition, within XML element writing a reference to said object based on XMI; and,
- n. if said value is an object and said feature is a composition, but said object has been streamed, within XML element writing a reference to said object based on XMI.

18. A storage medium as in claim 10 where streaming out a versioned step of said link in step d further includes the steps of:
- e. creating an XML element for said link based on XMI;
- f. within said XML element writing an xmi.version attribute identifying the version in which said link was created;
- g. determining if there is a version in which said link was removed, and if so;
- h. within said XML element writing and xmi.endversion attribute identifying all versions in which said link was removed.

* * * * *